(12) United States Patent
Jerome

(10) Patent No.: US 7,526,545 B2
(45) Date of Patent: Apr. 28, 2009

(54) CONTENT DISTRIBUTION SYSTEM

(75) Inventor: Jason Jerome, Los Angeles, CA (US)

(73) Assignee: Relevant Media LLC, Los Angeles, CA (US)

( * ) Notice: Subject to any disclaimer, the term of this patent is extended or adjusted under 35 U.S.C. 154(b) by 518 days.

(21) Appl. No.: 10/346,361

(22) Filed: Jan. 17, 2003

(65) Prior Publication Data

US 2004/0143667 A1 Jul. 22, 2004

(51) Int. Cl.
*G06F 15/173* (2006.01)
*G06F 7/00* (2006.01)

(52) U.S. Cl. .......................... 709/224; 705/27; 709/228

(58) Field of Classification Search ................ 709/223, 709/224, 231, 246, 228; 705/14, 26, 35, 705/52, 51, 27; 707/1

See application file for complete search history.

(56) References Cited

U.S. PATENT DOCUMENTS

| | | | |
|---|---|---|---|
| 5,983,227 A | 11/1999 | Nazem et al. | |
| 6,611,814 B1 * | 8/2003 | Lee et al. | 705/26 |
| 6,981,040 B1 * | 12/2005 | Konig et al. | 709/224 |
| 7,171,414 B1 | 1/2007 | Nazem et al. | |
| 2002/0077944 A1 * | 6/2002 | Bly et al. | 705/35 |
| 2002/0194355 A1 * | 12/2002 | Morita et al. | 709/231 |
| 2003/0046239 A1 * | 3/2003 | Geilfuss et al. | 705/51 |
| 2003/0055729 A1 | 3/2003 | Bezos et al. | |
| 2003/0065642 A1 * | 4/2003 | Zee | 707/1 |
| 2003/0105720 A1 * | 6/2003 | Ishibashi | 705/52 |
| 2003/0182413 A1 * | 9/2003 | Allen et al. | 709/223 |
| 2003/0191685 A1 * | 10/2003 | Reese | 705/14 |
| 2004/0049598 A1 * | 3/2004 | Tucker et al. | 709/246 |

OTHER PUBLICATIONS

Interactive Advertising Bureau, "Universal Ad Package", Dec. 11, 2002, New York.
David Hallerman, Emarketer, "Rich Media: Online AD Success Story?", Dec. 10, 2002.
Ask Jeeves Web Properties, "Banner Free in 2003", Jan. 6, 2002, California.

* cited by examiner

*Primary Examiner*—Jungwon Chang
(74) *Attorney, Agent, or Firm*—David P. Owen; Howrey LLP

(57) ABSTRACT

A system and method for distribution of content on a computer network between a plurality of content providers and a plurality of users. A plurality of content provider packets provided by one or more of the content providers are stored, and a link provided to users for access to the content provider packets. When a user activates the link the selected content provider packet is displayed and the user may store the content provider packet in a personal showcase display for future access by the user. Showcase access is syndicated across web enabled devices through revenue sharing agreements.

71 Claims, 10 Drawing Sheets

CONTENT DISTRIBUTION SYSTEM

BACKGROUND OF THE INVENTION

1. Field of the Invention

The invention relates generally to distribution of content between individuals and content providers and, more particularly, to a system and method for distributing and communicating marketing information and other content to individuals over the internet who have opted to receive it.

2. Description of the Related Art

Various communication technologies have long been used by those desiring to market goods and services, educate, promote causes or issues, or otherwise disseminate information or "content." The general objective of those providing this content is to have as many people as possible receive the content who may be interested in it, and to achieve this at the reasonably lowest cost. Advertising in newspapers and magazines, on billboards, on radio and television broadcasts are typical means used to reach a large audience. However, these means of communicating with the advertiser's audience are often annoying and intrusive.

The Internet has experienced enormous growth in the number of users and has become a means for content providers to disseminate their content to a large online audience. Email has become a vehicle for mass marketers to quickly reach a large audience at very low cost, by sending undirected and unsolicited marketing messages via email to hundreds of thousands of recipients at once. The resulting deluge of unwanted email messages has prompted internet users to disregard unsolicited messages or install software to filter out these messages. Banner ads and pop-up windows are other means commonly used by advertisers to display their message to world wide web users. As with unsolicited email, these devices have become an annoying and intrusive distraction which many users have become accustomed to ignoring.

From the user's point of view, such techniques force them to face a large volume of unsolicited and irrelevant information which includes offers for goods and services and other information in which they have no interest. Content providers who engage in such techniques risk alienating more consumers than they convert, and these techniques provide very low "hit" rates of consumers who actually go on to purchase an advertised product or act on the information provided.

However, consumers are increasingly turning to the world wide web to find information and to shop for goods and services. Search engines have become increasingly popular tools for consumers to sort through the vast amount of content on the web to find what information that is relevant and useful to them. However, such searches often suffer from intrusion by advertisers. Misleading meta-tags built into web sites can cause a search engine to list an irrelevant web site in the search results, and payments from advertisers to search engine providers and search engine key word brokers are routinely used to cause a certain advertiser's web site to be listed prominently in the search results.

Consumers rely on marketing messages to steer them in making nearly every transaction they perform. However, what is required is a new marketing paradigm which does not rely on bombarding consumers with unsolicited messages and that does not present irrelevant information to the consumer.

BRIEF SUMMARY OF THE INVENTION

The present invention addresses these problems by providing a system and method for distributing content to users in which the users select the content they wish to see. One aspect of the invention comprises a method for content distribution on a computer network between a plurality of content providers and a plurality of users accessing the network via user terminals. The method includes storing a plurality of content provider packets provided by one or more of the content providers, displaying a link to a user for access to a content provider packet, detecting the user's activation of the link, providing information to the user's terminal for display of the selected content provider packet to the user, and storing data indicating a request by the user to store the content provider packet for future access by the user.

Another aspect of the invention comprises a method for communication of information between a plurality of users and a plurality of content providers on a computer network, the method including receiving from at least one of the content providers a content provider packet, receiving from at least one of the users data indicating a selection of one of the content providers from which to receive a content provider packet, forwarding the content provider packet only to those users selecting the content provider, and storing data indicating the selection of the content provider by the at least one of the users to enable future access by the at least one of the users to the content provider packet.

In addition, another aspect of the invention comprises a method for accessing content on a computer network from a plurality of content providers and a plurality of users accessing the network via user terminals. The method includes storing a plurality of content provider packets provided by one or more of the content providers, displaying a link for access to a content provider packet adjacent to search engine results, sponsored links or matches, of a search conducted by a user, the link located adjacent to an item in the search engine results relating to the content provider packet, detecting the user's activation of the link, providing information to the user's terminal for display of the selected content provider packet to the user, and storing data indicating a request by the user to store the content provider packet for future access by the user.

Yet another aspect of the invention comprises a server computer for communication of information between content providers and users on a computer network, the server computer operatively coupled to a plurality of user terminals and one or more content provider terminals. The server computer includes a first memory for storing a plurality of content provider packets provided by or more of the content providers via the one or more content provider terminals, a second memory for storing a plurality of content provider packet selections from one or more users via one or more of the user terminals, a first program module for providing a link for access to a content provider packet, and a second program module for providing information to a user's terminal for display of the content provider packet to the user upon the user's activation of the link.

BRIEF DESCRIPTION OF THE DRAWINGS

Further features and advantages will become apparent from the following detailed description taken in conjunction with the accompanying figures showing illustrative embodiments, in which.

DESCRIPTION OF ILLUSTRATIVE EMBODIMENTS

The following is a description of one embodiment of a system for distributing content to users over a network, given by way of example only and with reference to the drawings. This content distribution system provides a means for content providers to create marketing information content, optionally customized by locale, and a means to distribute this content to targeted users that have opted to receive the content. The content may be delivered to any type of network or internet enabled device, such as a web browser, personal digital assistant, cell phone, interactive TV and the like.

The content providers may be any type of organization which sells goods or services, provides information or promotes causes. The content created by these content providers is formatted for delivery in a standardized but user-customizable format. This "content provider packet" may be viewed by opt-in consumers and other users and added to the user's personal collection of content provider packets in their private and secure "showcase." The actual content within the content provider packet may be updated periodically by the content provider and may be tailored to the demographic profile of the user. Revenue is generated by the user's visit to a content provider packet showcase as a result of agreements with the content provider who created the content provider packet.

The content distribution system is integrated into the web to provide access to the content provider packets and showcase displays, preferably from a multitude of sites such as search engines, web portals, and vendor's web sites who share in revenue generated by user activity relating to the content provider packets. In particular, by integrating with search engines the content distribution system preferably is able to take advantage of the popularity of search engines.

The content distribution system provides users the ability to choose to receive a content provider's packet, and other alert-type notifications, email content provider packet content to friends (known as viral marketing), and provides a personalized and customizable showcase of selected content provider packets accessible at any time. The system thus leverages the power of the two most popular online activities: searching and email.

Network Structure

Figure 1:
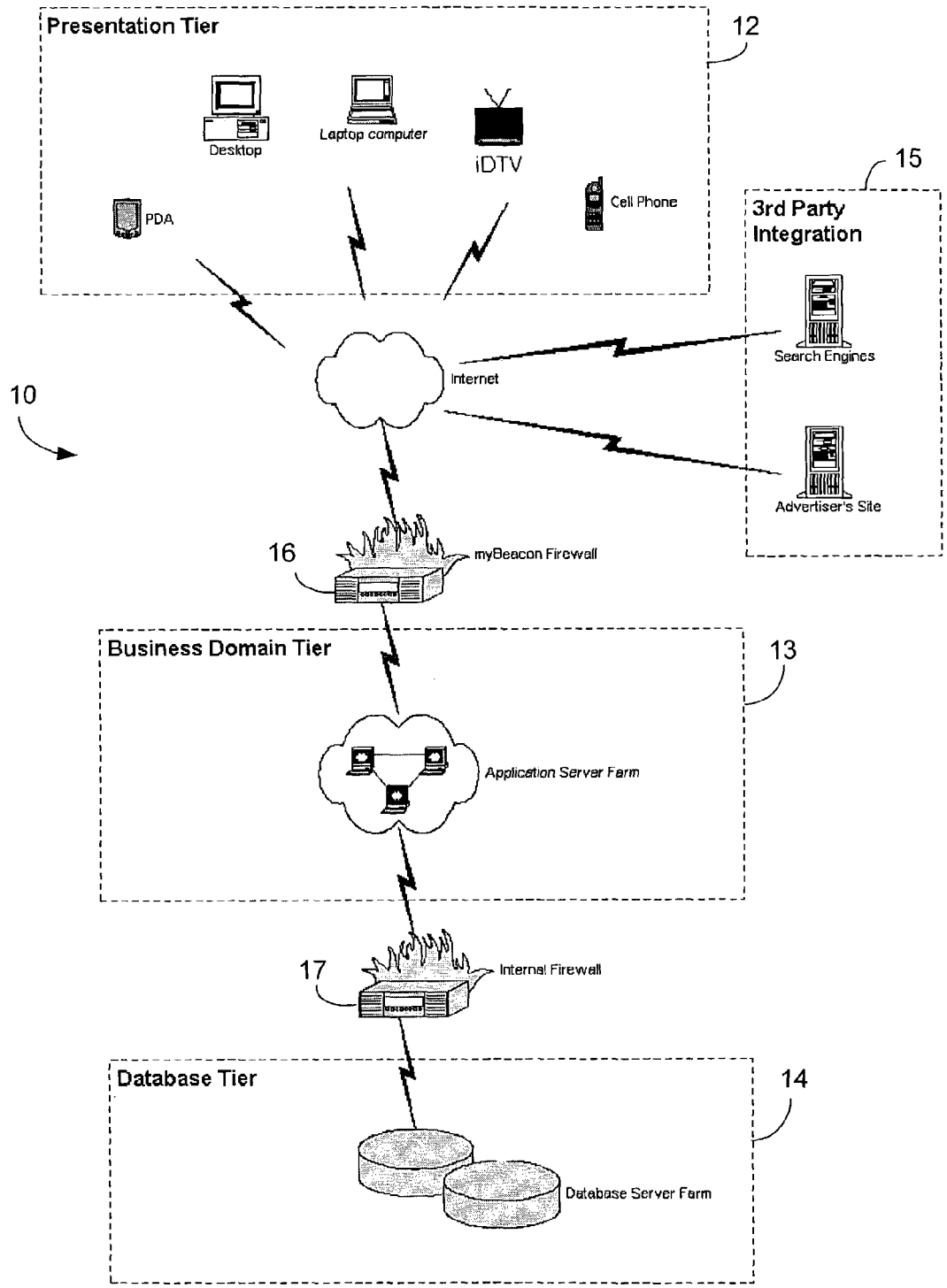
FIG. 1 shows a simplified network diagram of one embodiment of a system for distributing content.

FIG. 1 shows one embodiment of a content distribution system 10 with an object-based on a three-tier architecture including a Presentation Tier 12, Business Domain Tier 13, and Database Tier 14. The system preferably employs a web-based application centrally hosted in a secure environment. This architecture is designed to be robust and scalable at an incremental cost to allow the system to scale up as the number of users grows. Preferably no user installation or configuration is required to access any of the functionality of the system, which can be delivered to any web capable device.

The Presentation Tier 12, or user interface, comprises any web enabled device such as a web browser running on a computer, a personal digital assistant (PDA), cell phone, interactive digital television, or any other device that can render the visual aspects to the end user. The Presentation Tier 12 preferably permits integration with Third Parties 15 such as search engine web sites and advertiser's web sites. The Presentation Tier 12 preferably employs device dependent delivery standards such as Hyper Text Markup Language (HTML) or Wireless Markup Language (WML) for cell phones. The Presentation Tier 12 may contain minimal validation, but preferably does not include a substantial portion of the core business logic or processing, which preferably resides in the Business Domain Tier 13. This will allow presentation devices to be added with little to no changes in the core application.

The Business Domain Tier 13 preferably includes the core business logic. This logic is preferably written using object-oriented technology to reside and execute on an Application server platform. The Business Domain Tier 13 preferably controls security, allowing for encrypted traffic via https, provide email integration and scale as the user base expands. Wherever possible, Extensible Markup Language (XML) and web based services are used to allow greater interoperability and provide for easier changes and/or integration of other applications. At a minimum, the distributed content is preferably web services capable (i.e. able to render itself as XML).

The Database Tier 14 preferably consists of a robust relational database (RDBS) that can handle large volumes of transactions and referential integrity. The database preferably also accommodates business logic written in an object oriented language rather than a vendor's database proprietary language.

Firewalls 16 and 17 are preferably provided between each tier. The system platform is preferably an industry standard platform, such as Sun's Java2 Platform, Enterprise Edition (J2EE) or Microsoft's .NET platform. The J2EE Application server with commercial RBMS engine is preferred. Preferably, the system is easily administrated, uses open source software capable of later modification, and is easily integrated with third party systems and legacy systems via CORBA, Java, and SOAP interfaces. Clustering with load balancing is preferably supported, and Java usage provides cross-platform support and component reuse.

However, the NET platform may also be used, for example using the integrated Visual Studio.net IDE, preferably in C# hosted initially on Windows2000 and MS SQL Server. It will be apparent that many other platforms may also be used to implement the content distribution system.

Content Provider Packets

The content distribution system provides means for a content provider to design information and marketing content for packaging and distribution in a standardized but customizable format for distribution to consumers and other users. The content is provided in a "content provider packet." The content provider packet preferably permits delivery of the content to any web-enabled device. The system preferably permits opt-in selection by users, locale-specific content, both tied to a consumer's home locale as well as providing on-the-fly locale changes to encompass those users traveling or temporarily in a different location, XML generation of content into a Web-Service component, and the ability for users to "carry and recall" personally selected content to any internet access point.

Figure 2:
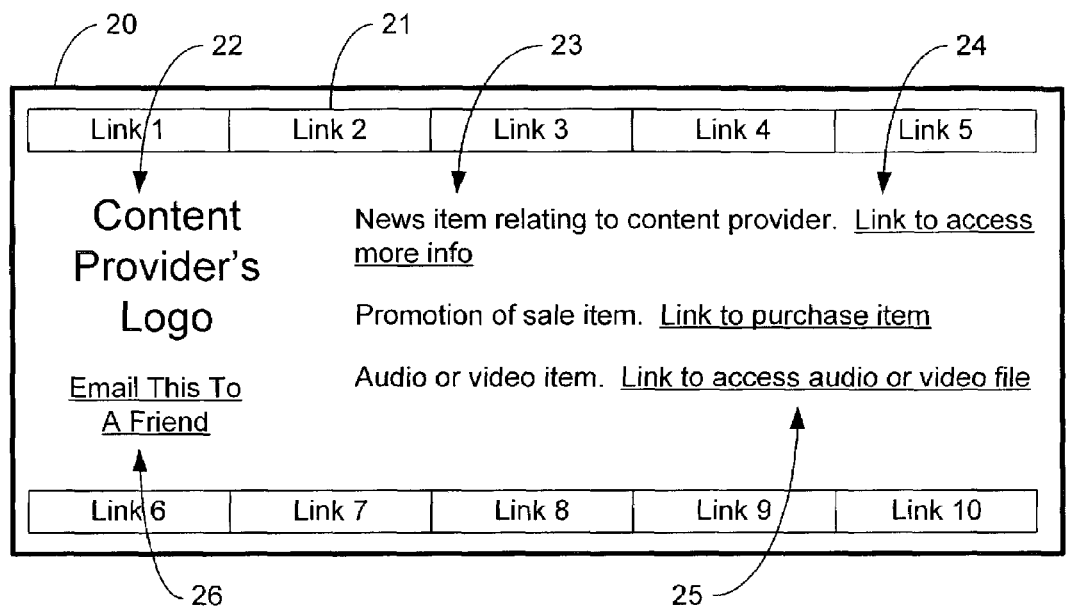
FIG. 2 shows an example of a content provider packet.

FIG. 2 shows one embodiment of a content provider packet 20. The content provider packet 20 in this embodiment is displayed as a rectangular box. Links 21 to other web pages are displayed along the top and bottom sides of the content provider packet 20, and additional links may also be included elsewhere with the content provider packet. The content provider's logo 22 will typically be displayed prominently within the content provider packet 20. Textual information 23 is also typically included in the content provider packet. Where the content provider is a vendor of goods or services this information will often take the form of one or more marketing messages. These may relate to topical information such as a sale of certain items or notable event currently taking place or anticipated in the near future or to information relating to the content provider or marketing message such as a slogan. The text information 23 may be accompanied by links 24 or act as links themselves to access additional information or to take action (such as make a purchase). Static or moving pictures or symbols may also be included in the content provider packet. Icons or targets 25 may also be included to activate functions such as playing a video or sound clip, downloading a file, program, applet or cookie, open another window etc. These can be used for example to play a portion of a CD or movie offered for sale, deliver a promotional message, or provide quick download or viewing of a prospectus or data sheet for a product or service. A link 26 is also preferably provided to enable the content provider packet to be forwarded to someone via email.

All of the content described above may be updated by the content provider as often as required. This updating capability retains the "freshness" of the content provider packet encouraging consumers to view the content provider packet again and again to see the latest content. It also enables the content to be up to date with current sales, promotions and events. For example, a content provider packet provided by a newspaper publisher would typically be updated at least once a day to include the day's headlines. A content provider packet provided by a football team would typically be updated each week to provide information on the team's next match and results from the last match. A content provider packet provided by a bookseller would typically be updated to provide information on an upcoming release of a new book or to provide the latest New York Times bestseller's list.

The creation and updating of content provider packets may be assisted by the use of algorithms, programs and/or web publishing tools to automatically identify and update content to be included in a content provider packet. Web publishing tools provided to content providers to integrate into the coding of their websites to assist with the later use of content provider packets. For example, such tools may include content markers which are integrated into the code of a content provider's web site and which identify content from the web site for inclusion into a portion of a content provider packet. This enables, for example, a content marker A to automatically send the marked content to a designated area within a content provider packet designated to receive content from content marker A. Other content markers could similarly be used to send content to designated areas within the same content provider packet or a different packet. When the marked content was updated on the content provider's web site, this would preferably automatically update the designated areas of the corresponding content provider packets. This tool may also be used to provide content to another content provider's packets to assist in creating cross-promotional efforts between different content providers.

Demographic Tailoring

The content in a content provider packet may also be tailored according to demographic information available about the person viewing the content provider packet. When creating or editing a content provider packet, the content provider can complete a demographic profile associated with the content provider packet. The demographic profile may include demographic parameters for use in modifying some or all of the content provider packet contents to suit the user viewing the content provider packet. In this way, multiple content provider packets may be created where each one is designed to target a specific subset of users by providing information which is specifically tailored to and more relevant to those users. Typical demographic parameters can include gender, age, marital status, number and age of children, household income, geographic information such as country, state/province, region, GPS location (latitude/longitude), city, postal (zip) code, telephone area code, and the like. Different content provider packets may be created by a content provider, for example, to promote men's clothing when viewed by a men's and women's clothing when viewed by a woman, or to provide information on local sales promotions and store locations to users residing in a particular city.

The users may also provide demographic information about themselves when visiting or registering with the content distribution system. This demographic information may include identifying and/or non-identifying information, i.e. information which can be used to identify the individual user such as name and address, or information which does not provide enough detail to identify the user such as age, gender, state/province, or city.

The content distribution system stores the content provider packet and associated demographic profile. When a user selects a content provider packet from a particular content provider for viewing, or views their showcase including a content provider packet from that content provider, the content distribution system accesses the demographic information of the user and any demographic profiles associated with the content provider packet(es) from the content provider in order to determine which content provider packet to display to the user.

The content provider may use this feature to direct different promotions to different groups of users so that the promotion is most appropriate to the user's location and their typical needs. It is important to recognize that the demographic profile is used to stratify and target individual users within the class of users who have requested to view the content provider's information, as opposed to using the demographic profile for unsolicited marketing efforts. This level of differentiation can increase the relevance of the material which is presented to the user to provide higher value to both the content provider and the user.

The content providers may also be provided with the ability to activate or deactivate content provider packets and/or add expiration dates to a content provider packet. This would allow a content provider to temporarily suspend an offering or to provide a limited time only offering, without having to remember to delete or edit the content provider packet at the desired time.

Viral Marketing

Each content provider packet preferably provides a means for the user to quickly and easily forward the content provider packet by email to friends, family, colleagues or other addressees. For example, in the embodiment shown in FIG. 2, each content provider packet includes an email link 26 in the content provider packet. When the user clicks on this link, a window or page is displayed for entry of one or more destination email addresses with an option to include a message from the user sending the content provider packet. A facility to extract email addresses from the user's email address book is preferably provided in order to make it as easy as possible for the user to forward the content provider packet to as many other people as possible. This facility to send a copy of a content provider packet to others implements a form of "viral marketing" whereby a user who has found a content provider packet which they find particularly interesting, or that the user thinks would be particularly interesting to someone they know, can be shared with others. The content provider packet may, for example, provide content that is particularly suited to the user's tastes or is particularly suited to the tastes of someone they know (e.g. a shop specializing in a particular type of product), or a content provider packet that relates to goods or products offered at an especially attractive price (e.g. a retailer having a sale), or a content provider packet that provides news of current interest (e.g. a sports team displaying their latest results). This provides a means of communicating with individuals that is not intrusive or annoying.

This form of distribution of content is particularly effective, where the individual users select the content and the recipients, and implicitly provide their recommendation of the content at the same time. The content provider packet being forwarded gains greater distribution among an audience with a high likelihood of being interested in the content of the content provider packet.

The content provider packet can be sent in different forms, for example solely as a link to the content provider packet stored on the content distribution system, as a complete display (in HTML or plain text for example) as the content provider packet appeared at the time it was sent which may also include a link to access the current version of the content provider packet, or as a complete packet of information including additional information not actually visible in the content provider packet viewed displayed to the user.

When a content provider packet is received by an email recipient who is also a registered user of the content distribution system, the content provider packet is preferably added to a "holding" area of the user's showcase display. This will enable the user to access the content provider packet (and all other content provider packets sent to the user since the last time the user visited their showcase) and decide what to do with the content provider packet. For example, the user could add the content provider packet to a particular category of their showcase display, delete the content provider packet, or keep it in their holding area. An option is preferably available to send a content provider packet as an email, send an email and add the content provider packet to the recipient's showcase holding area at the same time, or only add the content provider packet to the recipient's showcase without sending an email.

Figure 3:
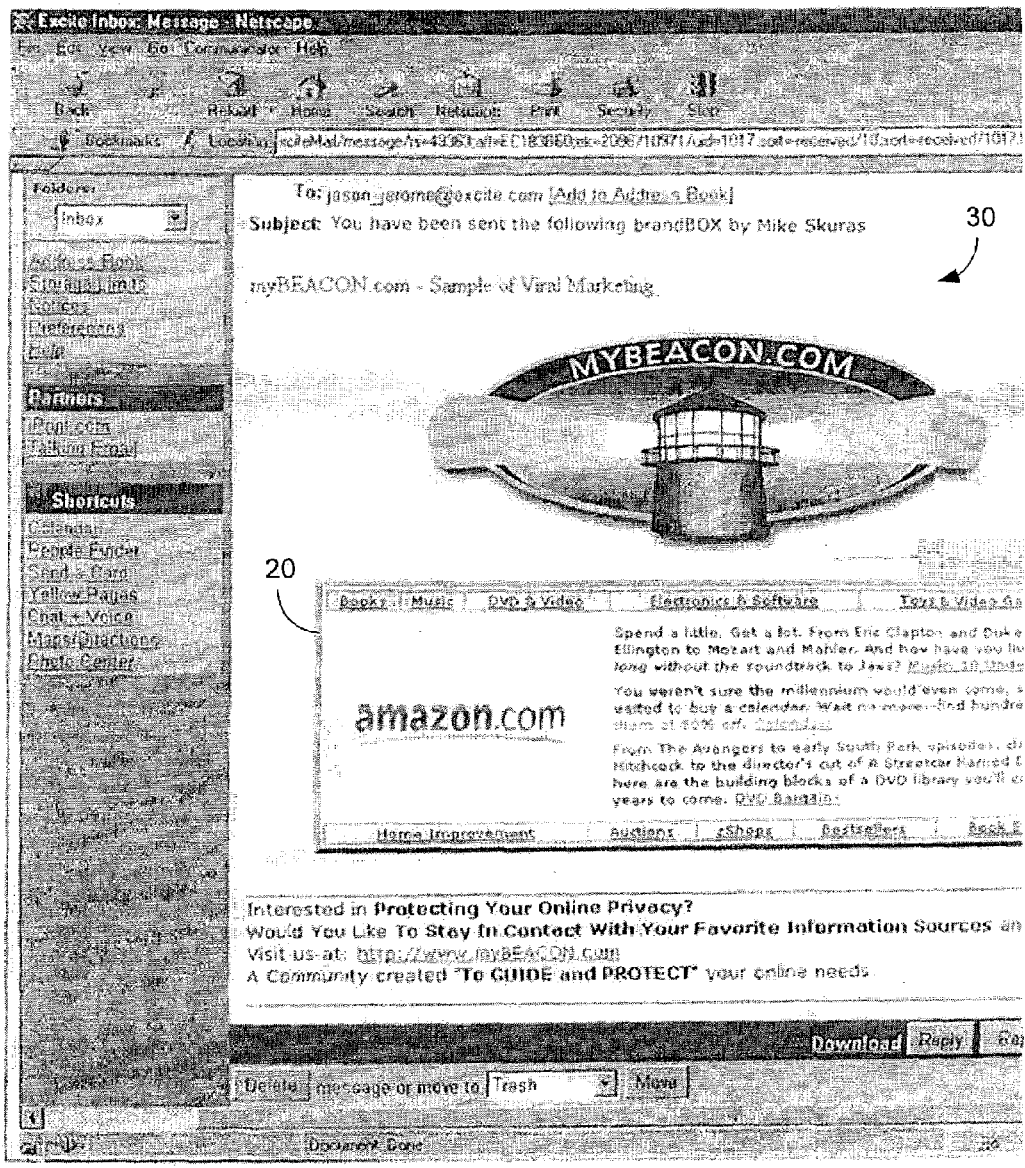
FIG. 3 shows an example of an email including a content provider packet.

When a content provider packet is received by an email recipient who is not a registered user of the content distribution system, the content provider packet preferably will be displayed in the body of the email itself. FIG. 3 shows a portion of a display showing an example of an email message 30 containing a content provider packet 20. The email with the content provider packet preferably includes a link to access an online version of the content provider packet. In this way, the recipient may view the content provider packet using their email program and then easily access the online version of the content provider packet by clicking on the link provided in the email (if viewing the email on a web enabled device).

A facility may also be provided to save a content provider packet to an off-line environment such as a computer hard drive, CD or diskette for off-line viewing, to give to others for their viewing or for addition to their showcase, for later printout or loading onto another computing device used by the user. The content provider packet preferably includes a link to enable the packet to link to an online version of the content provider packet if loaded onto a web-enabled device. In this way, the content provider packet can be updated with any content updates and the content distribution system will preferably be able to track any user activity in relation to the content provider packet.

The content distribution system preferably keeps track of and stores information regarding the forwarding of content provider packets by users to take this into account in fees charged to content providers and for revenue sharing, as described in more detail below.

Content Provider Packet Creation

The content provider packet provides a real-time direct marketing communication channel to the users who have selected to receive the information. Any type of organization which sells goods or services, provides information or promotes causes become a content provider and create and distribute their content using the content distribution system. These may include, for example, retailers, manufacturers, publishers, sports teams, cinemas, airlines, travel companies, newspapers, universities, stockbrokers, law firms, private clubs, or any other type of organization which desires to reach the public with a message.

The content distribution system preferably provides a means for content providers to register with the system and become licensed providers. The content provider may enter a license agreement with the content distribution system and preferably agree to pay a base licensing fee or pay per performance fee. The pay per performance fee may be based on any measurable metric, for example, a cost per number of user impressions (i.e. the number of users who displayed the content provider's content on their screen), a cost per number of user click-throughs (i.e. the number of consumers who not only view the content provider's packet but also click on a link in the packet to access another page), a cost per action (i.e. a fixed fee or a share of revenue generated when a user takes certain actions, such as purchasing something from the content provider as a result of viewing the content provider's packet), or a combination of such fees.

The content providers are preferably provided with a template for creating their content provider packets. This template permits customization of the content in the packet while still retaining a similar look and feel across different content provider packets from different content providers. Different versions of the content provider packet may be created for different demographic markets, and for different format displays for viewing on different web enabled devices. The content providers may periodically update the content of their content provider packets and preferably provide for automatic insertion, deletion or modification of a content provider packet at predetermined times or periods. This may be used, for example, to list a content provider packet with the content distribution system for a prescribed period during a particular promotion period or to automatically update a content provider packet to coincide with a particular event.

The Showcase

Selected content provider packets may appear to the user who selected them in many different forms suitable for different purposes and for display on different web enabled devices. These different displays may include, for example: a display of a single content provider packet and a "showcase" display which includes multiple content provider packets permitting simultaneous viewing of several content provider packets. These two displays may be formatted in a full screen display format for viewing on a personal computer or similar device and occupying a full screen or full window; a small display format for viewing on a search engine, a vendor's or other host's web site, a simplified display format for display of multiple or single content provider packets on PDA or cell phone screens. The content provider packet and showcase displays may also be adapted for display on a web-enabled TV system. Furthermore, the content provider packets may include video and/or audio components which may be displayed or played on a cell phone, PDA, iDTV, PC or any other device.

Figure 4:
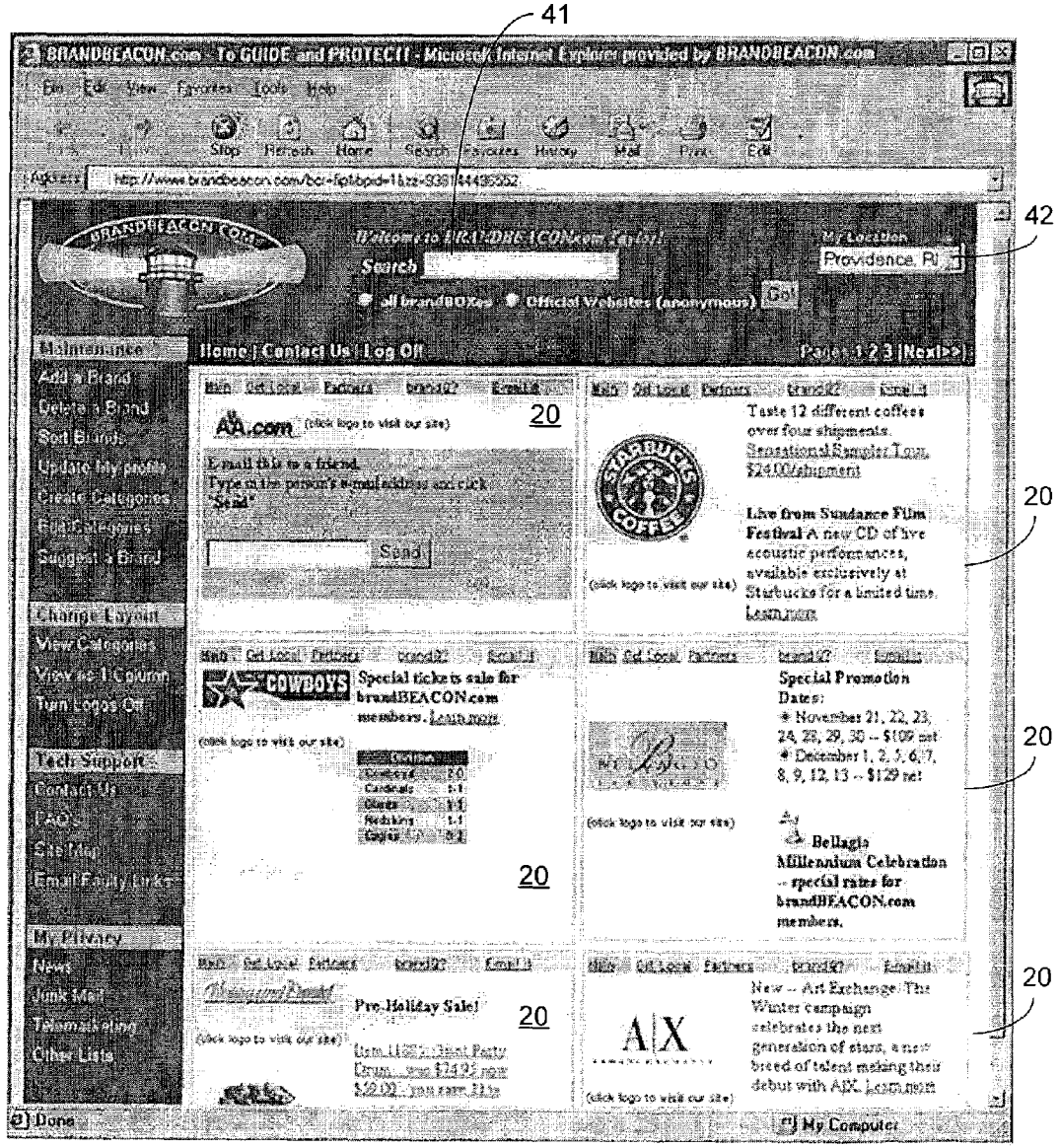
FIG. 4 shows an example of a showcase display for displaying a content provider packets.
Figure 5:
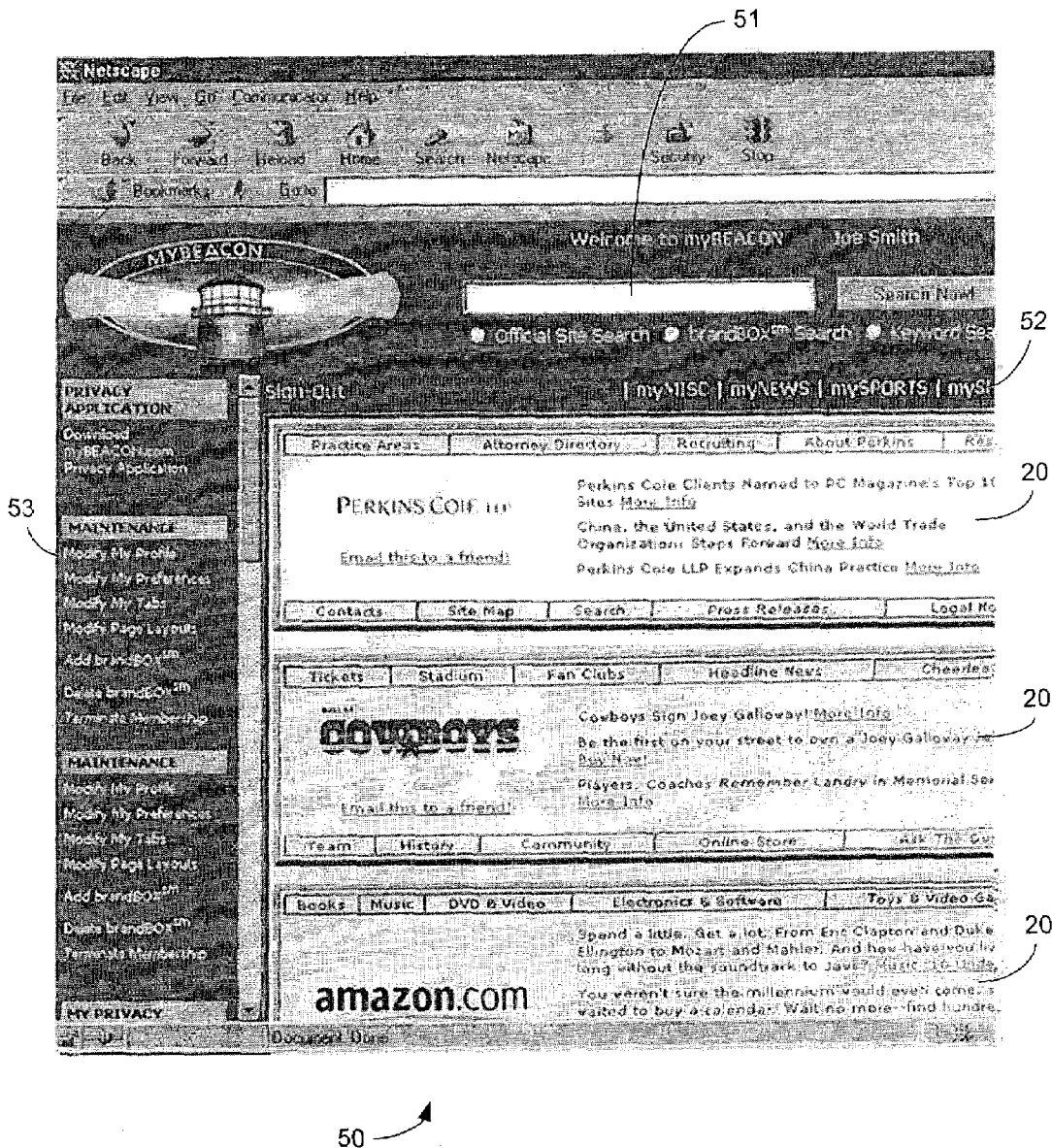
FIG. 5 shows a second example of a showcase display for displaying a content provider packets.

FIGS. 4 and 5 show two embodiments of a showcase display for displaying multiple content provider packets. The showcase "collects" content provider packets selected by a user together for viewing on a single set of related pages. When a content provider packet is selected by a user, the content provider packet is added to the database for that specific user and the content provider packet is added to that specific users showcase. Thus, the showcase becomes a portal into the database of user-selected content provider packets. The showcase is thus a collection of content displayed in a standardized format where the user himself/herself has selected the content providers who will provide that content. In this way, the showcase can be considered similar to a personalized newspaper or personalized set of yellow pages. From the user's perspective, it provides around-the-clock real-time access to content selected by and thus relevant to the user, where the content is updated regularly to keep it current and customized to the demographics of the user. From the content provider's perspective, it provides a "channel" directly to the user where the user has opted-in to receive the content provided and is more likely to repeatedly revisit the channel to view updated information.

In the example shown in FIG. 4, a showcase display 40 includes content provider packets 20 displayed as rectangular display areas, with two columns of content provider packets shown at one time. The standardized format of the content provider packets produces a concise and predictable format for the showcase and produces a certain amount of familiarity for the users. But although the basic format will become familiar, the content of the content provider packets will preferably change regularly as each content provider updates their content provider packets. The arrangement of the content provider packets on the showcase may also change as explained in more detail below.

The showcase preferably provides means for the user to arrange the content provider packets into categories. These categories may include, for example, content related to sports, clothing, travel, investments and financial, media and current events, entertainment, and any other category that may be of interest to a user. This may be accomplished, for example, by providing certain preset categories of general interest to most users. These categories are preferably made available to the content providers when creating or editing their content provider packets. The user may also be permitted to create additional categories to suit the user's particular interests. In the example shown in FIG. 5, showing a portion of a showcase display 50, the showcase display includes links or tabs 52 to each category. Selection of the category link displays all of the content provider packets which fall into the category. The user may be provided with a facility to "drag and drop" content provider packets into the desired categories to achieve an arrangement that suits the user.

Each category of the showcase will thus comprise a collection of content provider packets selected by the user. The number of content provider packets in a given category may be so large that they cannot all be displayed on the user's screen at the same time, requiring the user to scroll or page down to see all of the selected content provider packets. The arrangement of content provider packets within each category (or within the showcase where no categories are provided) may be determined in different ways. The user may be permitted to move the content provider packets within each category (of within the showcase) to achieve the layout desired by the user. For example, during football season the user may wish to place a content provider packet provided by the user's favorite football team at the top of the showcase "sports" category page. Later in the year the user may then wish to move the content provider packet provided by the user's favorite basketball team to the top of the same page.

An alternative means for arranging the content provider packets within a showcase category (or within the overall showcase) is to determine placement on the basis of bids received from the content providers. A content provider wishing to gain prominent placement of their content provider packet with the showcase or applicable showcase category may submit a high bid to the system host. For example, where a content provider submitted the highest bid within a showcase category this would result in the content provider's content provider packet being placed at the top of the page when the category was displayed. This prominent placement of the content provider packet provides greater exposure to the users who have put that content provider packet into their showcase which increases the probability that the user will see and interact with the content provider's content and purchase the content provider's goods or services or click through to the content provider's web site. This provides a mechanism for the content provider to pay a higher fee for improved exposure to the system's users. The categories and the average and high bids specific to each category is preferably provided to the content providers when bidding on content provider packet placement.

The arrangement of content provider packets within a category may change periodically or upon receipt of changed bids from the content providers. For example, during football season a football team may increase their bid to increase the prominence of their content provider packets to gain greater exposure to their fans during the period when they are most likely to want to view the team's content provider packet. At other times the team may reduce its bid to lower its costs during the off season. The arrangement of content provider packets may also change when a user selects a new content provider packet and thus adds to the collection of content provider packets displayed in a given showcase category.

Another means for arranging the content provider packets within a category may be a hybrid of the above options where the content provider's bids determine the initial placement of the content provider packets but the user is then permitted to rearrange the content provider packets. Many other means for determining the arrangement of content provider packets are possible, providing various means for the user and/or the content providers to determine the arrangement. For example, content providers may offer to pay a certain amount per thousand impressions (e.g. per 1,000 times the content provider packet is viewed by users) and the content provider packets may be arranged within a showcase category so that the content providers who have agreed to pay the most per thousand impressions have their content provider packet positioned higher in the showcase category than others with lower offers.

Alternatively, content providers may offer to pay a certain amount per number of click-throughs (e.g. per hundred times users click on a link in the content provider's content provider packet to access their web site) and the arrangement of content provider packets within a showcase category determined by taking these bids into account. As another example, content providers may offer to pay a percentage of revenue received by the content provider as a result of a user viewing the provider's content provider packet and the content provider packets arranged accordingly. Furthermore, the arrangement of content provider packets may be determined by taking into account a variety of different types of bids from content providers, for example by applying a formula to equate different types and bids and arrange the content provider packets accordingly.

The showcase provides a way for the users to view their selected content in a relatively compressed, organized and concise format. When a user visits his/her showcase to view a particular content provider packet he/she will be exposed to other content provider packets apart from the one they originally intended to view, providing a cross-promotional advantage. For example, the user may visit the showcase to view a content provider packet provided by a local cinema to see the show times for a movie the user wishes to see. The user may visit the "entertainment" category of the showcase and while looking at the content provider packet he/she intended to view, would be exposed to content provider packets provided by other entertainment content providers and would get a view of the other entertainment options available. These other entertainment options would all be provided by content providers that the user had previously selected, as a consequence being relevant to the user's tastes and much more likely to interest the user.

The showcase also provides a convenient means of displaying the stored content provider packet selections, acting as a kind of enhanced "bookmark" or "Favorites" functionality. The showcase acts as a kind of personalized and secured "virtual locker" into which the user throws items (i.e. content provider packets) that interest them, for access and review at a time of their choosing. The content provider packets will remain in the virtual locker (i.e. the showcase) for future visits by the user and can be put into an arrangement that makes it easy for the user to find the content provider packets for future reference.

The showcase preferably provides various facilities, such as a showcase category search engine, for users to facilitate access to their selected content provider packets. A search field (for example search field 41 and 51 in FIGS. 4 and 5) or separate search window preferably provides the ability to search for selected content provider packets already in the user's showcase, or search within the universe of all content provider packets to find a content provider packet of interest to the user. Once a content provider packet is located using the search facility, a simple mechanism is preferably provided for the user to quickly add the content provider packet into the user's showcase (if it is not already selected).

The showcase also preferably provides a location indication and facility for the user to select a different location. For example, the embodiment shown in FIG. 4 includes a small window 42 with a drop down list of locations and the currently selected location showing in the window. This permits the user to choose a different location, thus causing the content provider packets to update to display content specifically tailored to the chosen location (where the content provider packets provide this functionality). For example, if the user resides in New York but accesses their showcase while on vacation in Orlando, Fla., they may change the location field on their showcase to the Florida location. This could enable the user to view a content provider packet from a car rental company that the user had previously added to their showcase, where the content provider packet automatically displays the local rates and locations of outlets in Orlando rather than New York.

Facilities for a user to enter additional demographic information about themselves may also be provided on the showcase display (for example target 53 shown in FIG. 5). This information will assist the content providers in tailoring the content of their content provider packets more closely to the anticipated needs and tastes of the user. Additional functions relating to the showcase display are discussed below in conjunction with the Showcase Manager module.

Content Provider Packet and Showcase Access

The content distribution system preferably provides means to access the content provider packets and showcase displays via web portals, web search engines, browser toolbars, online web sites, iTV menus, PDA menus, cell phone menus (and the menus of future web enabled devices such as tablet PCs etc.). This integration may be accomplished in a variety of ways.

Figure 6:
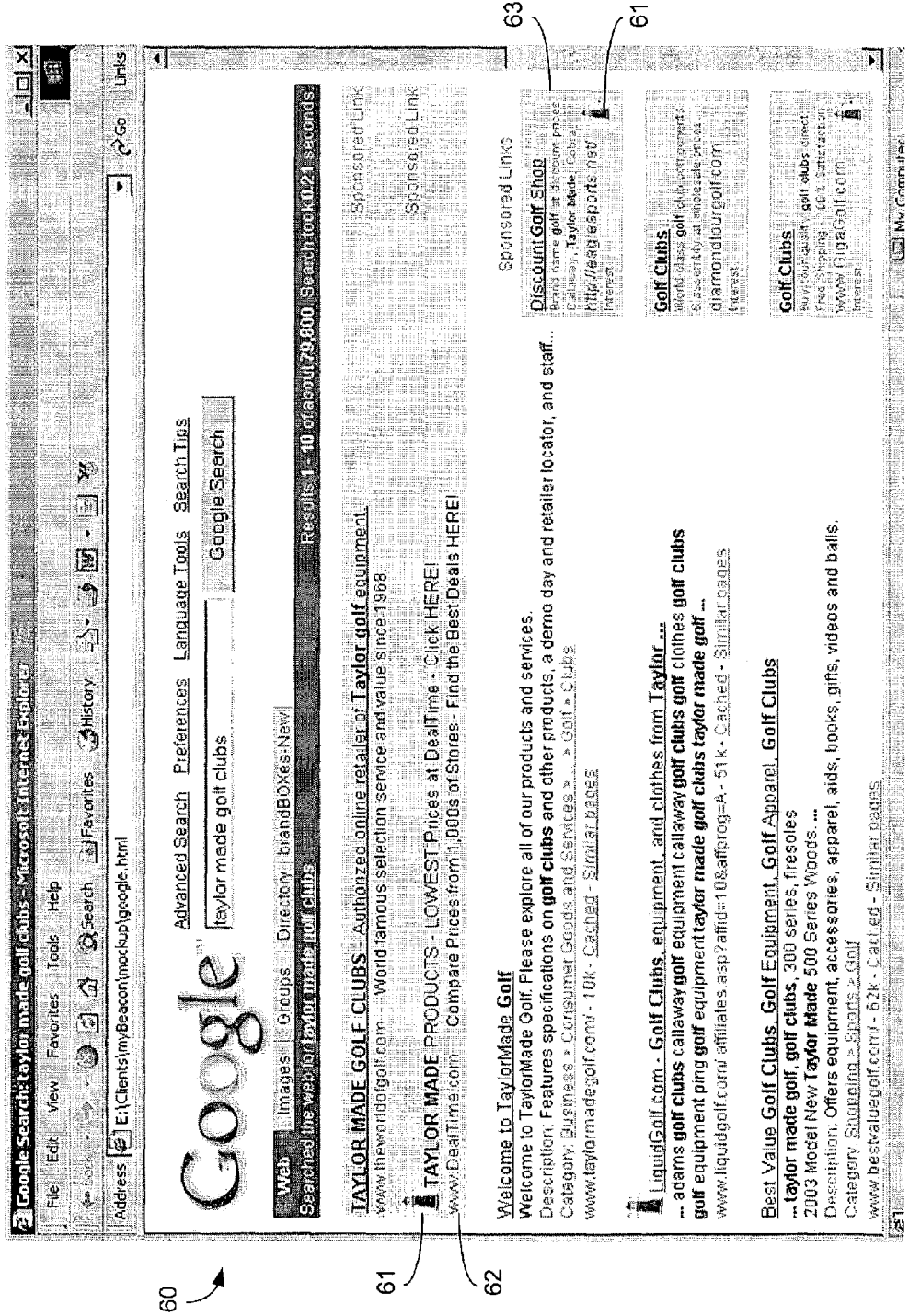
FIG. 6 shows an example of a search engine web site with system icons displayed next to search result items.

FIG. 6 shows an example of a search engine web site 60 with the results of a user's search displayed. A content distribution system icon 61 (referred to as a "system icon" below) in the form of a lighthouse symbol (although any other recognizable symbol may be used) appears adjacent to some of the search result items 62 and sponsored links 63 listed on the page, indicating that a content provider packet exists for the vendor or other content provider associated with the search result item or sponsored link. Preferably, adjacent the system icon 61 is a brief message from the content provider packet provider giving additional information which can be used to encourage the user to select the icon, although in other embodiments the icon can be displayed without this additional message. In addition to the system icon 61 for access directly to a content provider packet, a showcase icon may also be provided for access directly to the user's showcase display. This may be to a showcase homepage, a default page, or a page selected by the user for first access to the showcase (such a page displaying the user's favorite category of content provider packets).

When the user selects one of the system icons (which may be accomplished by positioning a cursor over the icon and clicking on a mouse button; using a remote for an interactive web enabled television or iDTV device, the tap of a stylus on a PDA screen, pressing keys on the face of a PDA or cell phone etc.) a page generated by the system host is displayed. If the user has already registered as a user with the content distribution system and is already logged on to the content distribution system, the page displayed will preferably be a full screen display of the content provider packet selected (i.e. the content provider packet associated with the search engine results item adjacent to the system icon) or the user's showcase display with the selected content provider packet in the showcase.

Selecting the system icon may result in both display of the selected content provider packet and addition of the content provider packet to the user's showcase in one click. Alternatively, the content provider packet may be displayed and a further action required from the user in order to add the content provider packet to the user's showcase. For example, the user may be provided with multiple options from the page initially displayed, enabling the user to create a new showcase, access an existing showcase, add the content provider packet to the user's showcase, and/or email the content provider packet to a friend.

If the user is registered as a user but is not logged on, a brief showcase login window or showcase login page is preferably displayed for entry of a username and password to gain entry to the showcase. After successful showcase login, the content provider packet originally selected by the user is displayed as described above.

If the user has not previously registered as a user with the content distribution system or is not recognized by the content distribution system, the selected content provider packet will still be displayed. The user may then opt to forward the content provider packet via email to a friend without registering. Additionally, a link to a new user registration page and/or a message to encourage new user registration may be displayed as well. This method of immediately displaying the selected content provider packet prevents the user registration process from becoming an obstacle to the user viewing the content provider packet, and reduces the number of users who opt out before viewing the content provider packet. Alternatively, the user may be taken to a new user registration page and upon completion of the registration taken directly to view their selected content provider packet which is now displayed in their just created showcase page. New user registration is described in more detail below.

Figure 7:
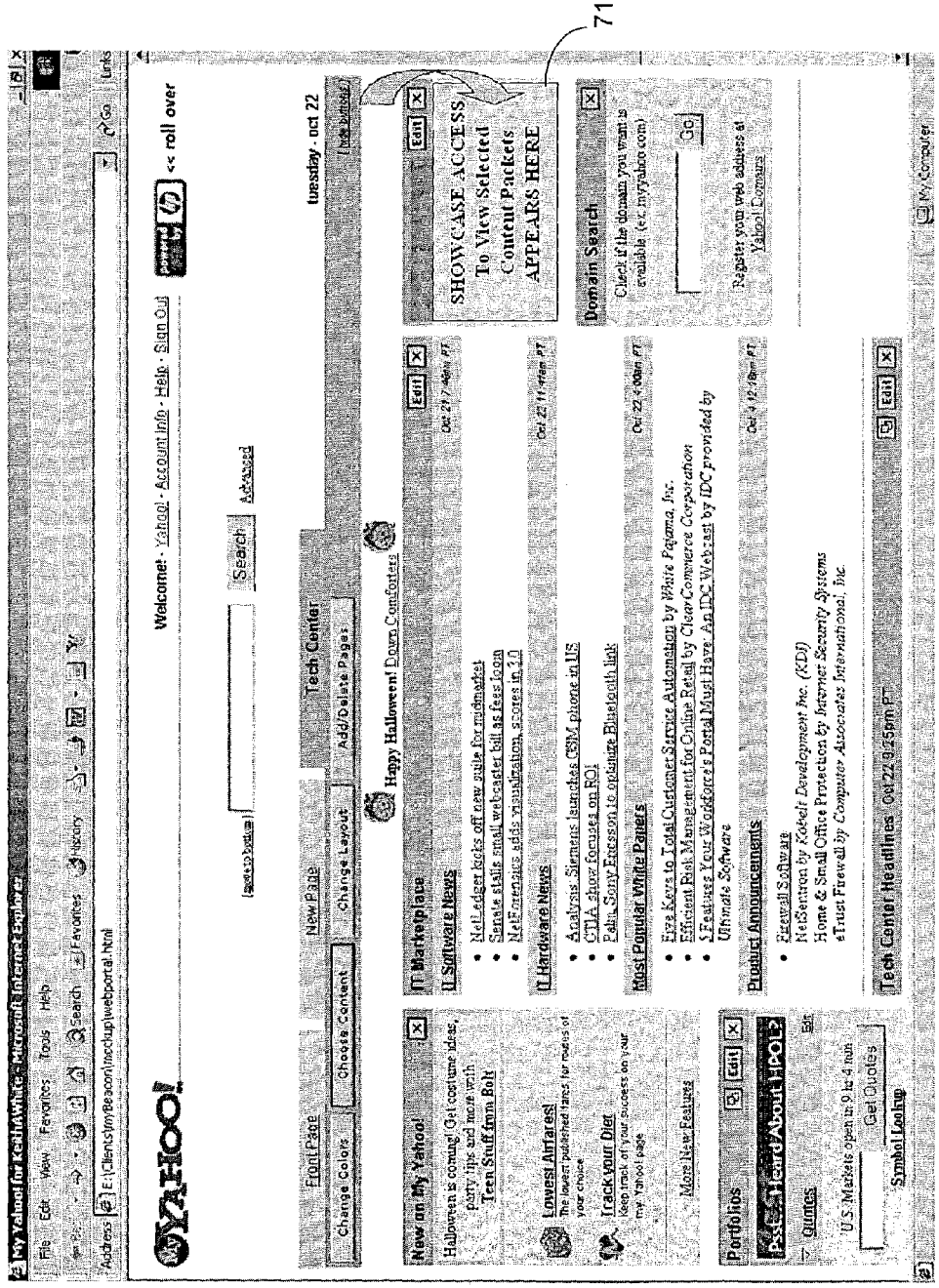
FIG. 7 shows an example of a web portal including a link to a showcase in the content distribution system.

FIG. 7 shows a web portal 70 including a login link 71 to the content distribution system or content provider packet showcase. This link 71 could also be displayed as an content distribution system icon similar to the example described above. This showcase login link preferably has functionality similar to the system icon 61 described above, except that the link is not associated with any particular content provider (e.g. unlike the icon appearing next to a search results item, the link appearing on a web portal may or may not be associated with particular provider of goods or services). As a consequence, the link 71 shown in FIG. 7 preferably links the user to the user's showcase, to a welcome page or a default page selected by the user or the content distribution system.

The content distribution system preferably includes a revenue sharing scheme to distribute revenue received from the content providers to third parties who host the system icons or links to the content distribution system. Thus, where a search engine web site displays a system icon (which preferably appears next to search engine result listings) a user clicks through to access a content provider packet, a share of any revenue derived as a consequence (e.g. revenue derived by the content distribution system as a result of the user's purchase of goods or services through the selected content provider packet or interaction with the content provider packet) may be given to the search engine web site as a fee for displaying the icon and "distributing" the content provider packet. This revenue sharing is described in more detail below.

Figure 8:
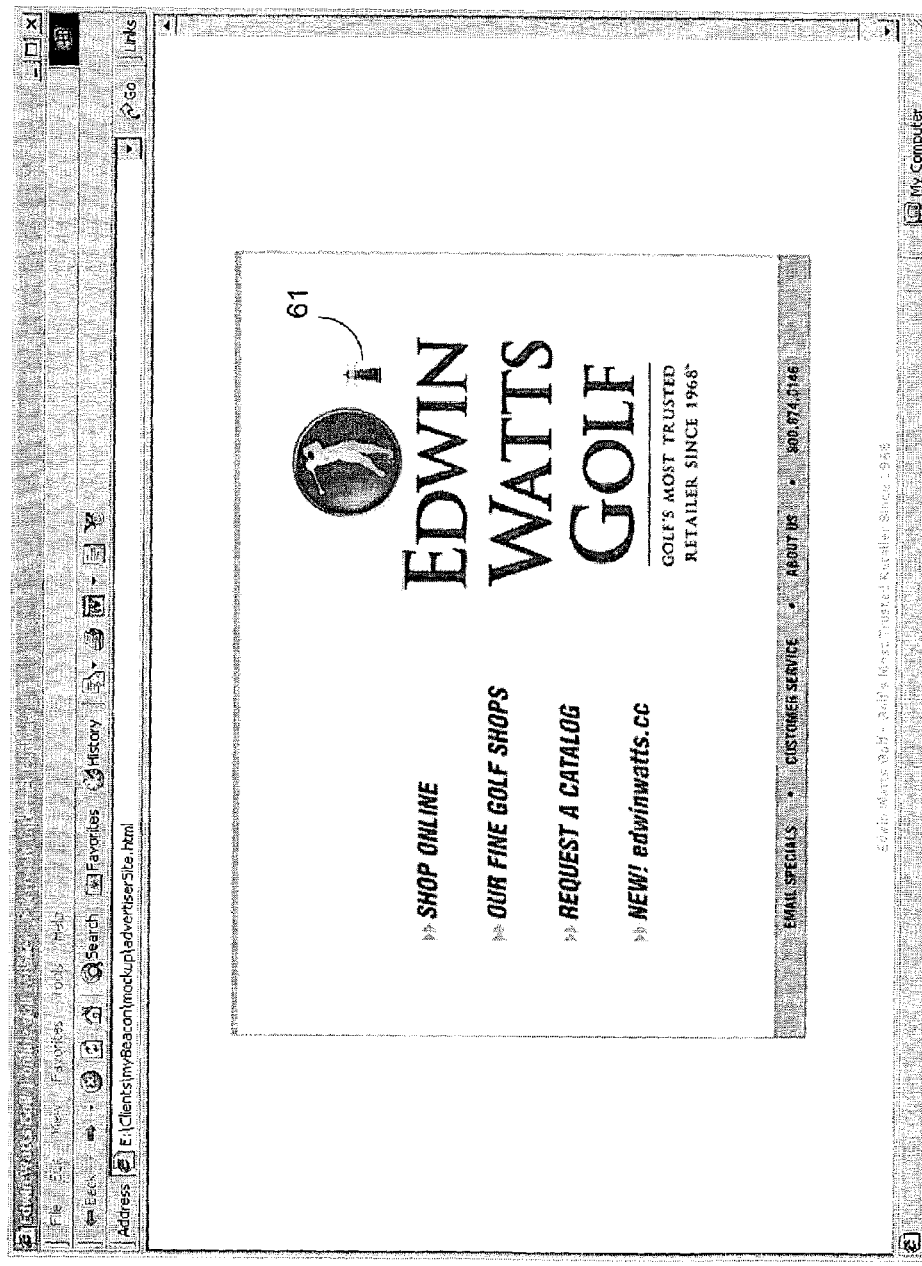
FIG. 8 shows a vendor's web site with a system icon to the content distribution system.

FIG. 8 shows a vendor's web site 80 with a system icon 61 to the content distribution system. The link 61 from the vendor's web site will preferably link to a content provider packet provided by the vendor and relating to the goods and services offered by the vendor. The link 61 preferably operates as a way to access the user's showcase (or to become a user of the content distribution system) and at the same time to add the vendor's content provider packet to the user's showcase. The vendor is thus motivated to include an icon or link to the content distribution system to encourage users who visit the vendor's web site to add the vendor's content provider packet to the user's showcase so that it will be available for viewing any time the user visits his/her showcase. Thus a one time visit to the vendor's web site and user's selection of the vendor to add to the showcase has opened a real-time direct marketing communication channel from the vendor to the user.

Figure 9:
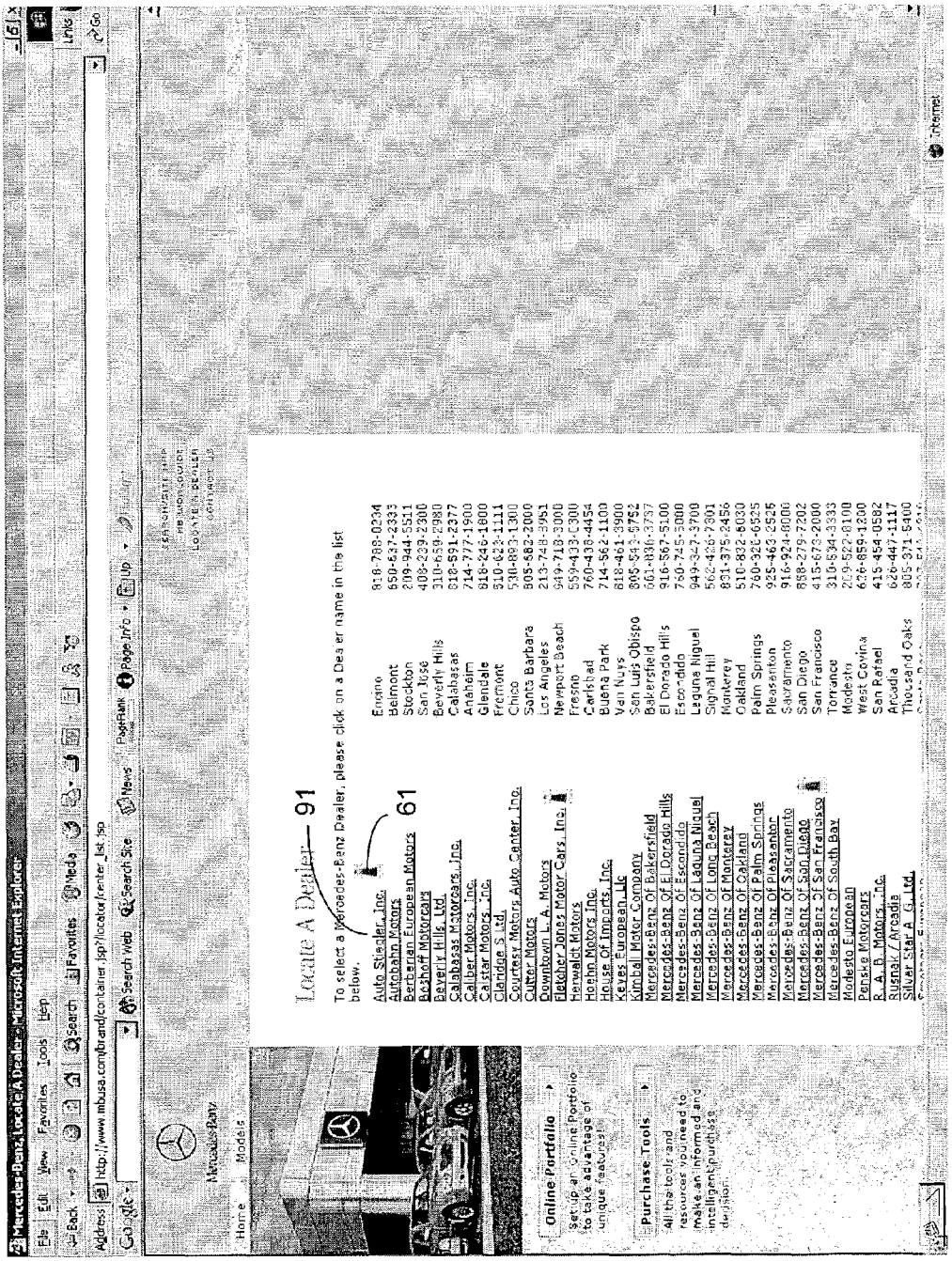
FIG. 9 shows a web site with syndicated system icons to the content distribution systems.
Figure 10:
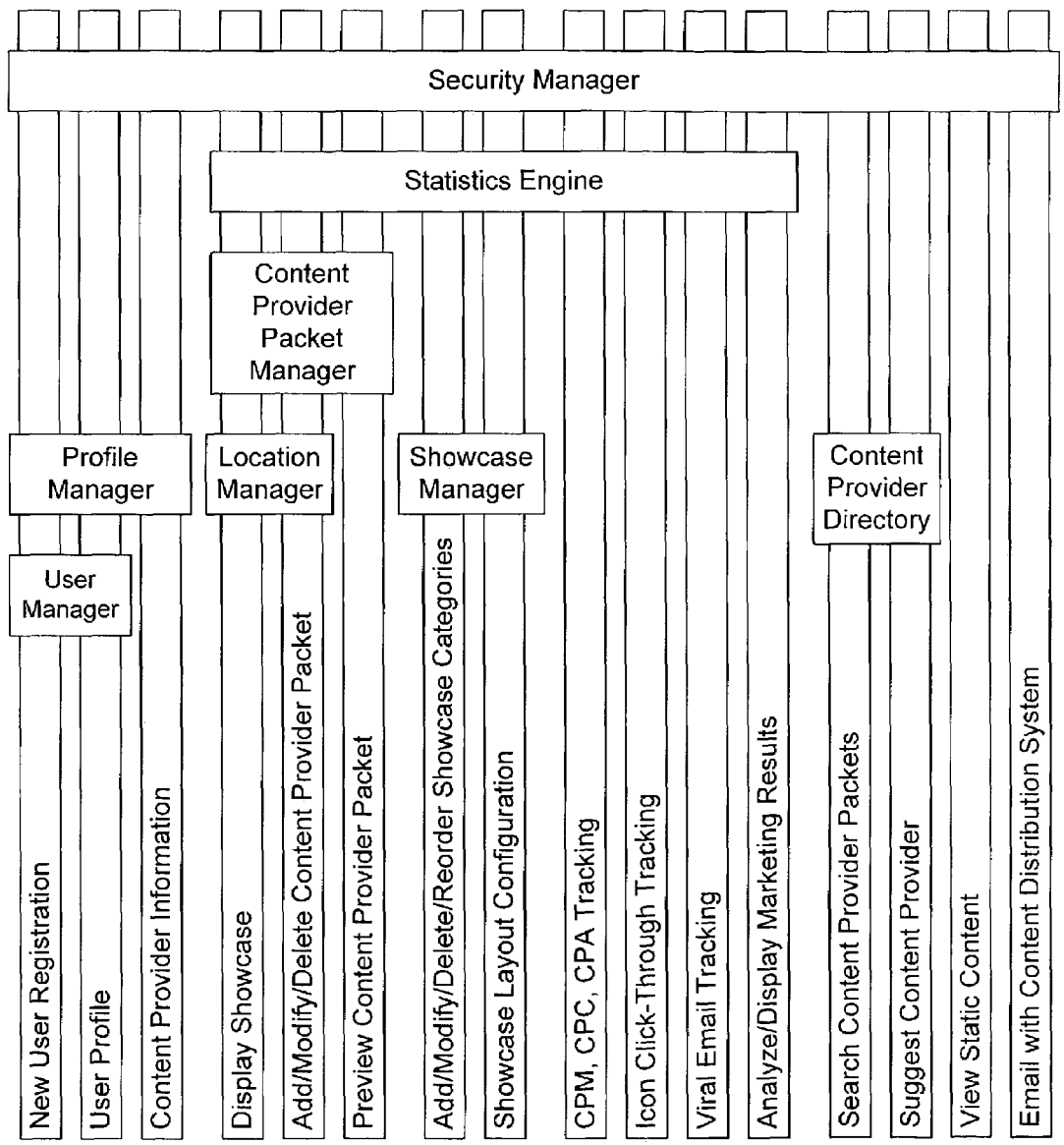
FIG. 10 shows an example of functional modules comprising the content distribution system and their functional relationships.

FIG. 9 shows an example of a web site 90 also displaying system icons 61 for access to the content distribution system. Web site 90 includes links 91 to other web sites, some of which are registered as content providers with the content distribution system. A system icon 61 appears adjacent to the links for these content providers. The link 61 preferably operates to access a content provider packet from the relevant content provider, similarly as described above.

A user's showcase is also preferably accessible from any web page and from any web enabled device. Any company who is able to provide users with showcase access over any web enabled device may benefit by potentially providing access to users to view their selected content provider packet in a showcase and take advantage of the cross-promotional benefits provided by a showcase, and by gaining a share of revenue derived from a user's viewing and/or interaction with the content provider packet. Any provider who allows a user to access their showcase through that provider's showcase access icon will participate in the revenue sharing model during that user's visit to their showcase.

The content distribution system may include more than one showcase display per user and may include different types of system icons for access to these different showcase displays. This may be a consequence of access from different web pages of different business partners. For example, search results from Search Engine "A" may include system icons which link to a showcase display "A", which may be branded with Search Engine A's name and logo. This showcase may include content provider packets selected by the user from system icons appearing on Search Engine A's web site. A system icon branded with Search Engine A's name or logo or otherwise identified with Search Engine A may also be used to access the showcase A, both on Search Engine A's web site and distributed to other web sites. These icons may be used to select content provider packets for addition to the Search Engine A branded showcase. Similarly, another Search Engine "B" or Web Portal "C" may also direct users to separate showcase displays "B" and "C" branded with their name or logo and may distribute system icons identified with Search Engine "B" or Web Portal "C". Thus, for example, the showcase A becomes an extension to the services offered uniquely by Search Engine A.

Revenue Sharing

The content distribution system preferably participates in a revenue generation and sharing scheme to encourage the creation and distribution of content provider packets, and to encourage the distribution of icons for accessing the content provider packets or showcase displays. As discussed above, revenue-generation occurs as a result of user's taking actions relating to the content provider packets. A content provider may enter a license agreement with the content distribution system and agree to pay a base licensing fee or pay per performance fee. Pay per performance fees may include, for example, a cpm fee (cost per 1,000 user impressions), a cpc fee (cost per user click through), a cpa fee (cost per action), or a combination of any of these types of fees. The cpa fee may be a fixed fee or a share of revenue generated when a user takes certain actions, such as purchasing something from the content provider as a result of viewing the content provider's packet. Preferably no fee is charged for addition of a content provider packet to a user's showcase.

This fee income will be paid by the content providers to the content distribution system. A portion of the fees is preferably shared with any third parties who participated in the process by providing access to the content provider packet through which fee income was generated. Each organization that hosts a system icon or otherwise provides access to a content provider packet, showcase or content distribution system page will share revenue. For example, if a user clicks on a system icon displayed on a search engine's site to access a content provider packet, a portion of revenue generated as a result of the user's visit to the content provider packet will preferably be shared with the search engine that displayed the system icon.

Functional Modules

The content distribution system is preferably broken down into several functional modules, some of which are vertical and some cross vertical functions and are horizontal in nature, as shown in FIG. 9. These modules are logical breakdowns for design, architecture and functional needs, but may, depending on the technologies used, be implemented as actual modules, may be broken down into several modules, or may have all their requirements satisfied by other modules and may be eliminated.

User Manager

A User Manager is preferably provided for managing user's accounts in the content distribution system, and provides facilities for user registration (in conjunction with the Profile Manager), the creation, storage and retrieval of specific user's account information, and the association of users with locations (in conjunction with the Location Manager) and other demographic information.

The User Manager preferably provides facilities for registration of new users which allows a site visitor to quickly register and login, thereby becoming a registered user of the content distribution system. Preferably a minimal amount of information is required from the new user in order to register, with facilities for the user to furnish additional information, either at registration time or in the future within his personal showcase, to help customize the content provider packet content according to the user's demographic information. Registration is preferably optional but encouraged.

Registration provides a user with the ability to customize the layout of their showcase, for example by arranging their selected content provider packets in categories, and to enter demographic data to customize content provider packet content for the user's locale. Once registered on a given computer or other web enabled device, a browser cookie from the content distribution system may enable automatic login to their showcase or the ability to select and add content provider packets to their showcase in the future.

The user's email address is preferably used as the default login name for a user, if it is unique to the system. If an alternate login name is used, it too is preferably unique to the system. An internal user ID is preferably generated and used by the content distribution system to uniquely identify a user and to enable the user to change their email and/or alternate login but remain as the same user identity for tracking purposes. A password is required to login. All passwords will preferably be encrypted and not viewable as plain text. Any "forgotten" passwords can only be reset with a new password, changeable by the user upon login.

Information typically required includes the user's validated email address (used for login name if alternate login not supplied) and password. Additional information that may optionally be required includes the user's name and address, an alternate login if the user's email address is not used for this purpose, postal area code (i.e. Zip code) and opt-in notifications and preferences.

Profile Manager

A Profile Manager is preferably provided for storing and retrieving User Profiles and provides facilities for the creation, storage and retrieval of user profile information.

Information requested from the user during user registration is preferably able to be revisited by the user at any time to make changes or updates. The Profile Manager preferably maintains confidential profile information within the content distribution system for all users. This User Profile is preferably accessible from all user pages following successful login to the system.

Content Provider Manager

A Content Provider Manager is preferably provided for managing content providers' accounts in the content distribution system, and provides facilities for content provider registration, the creation, storage and retrieval of content provider's account information, content provider's registration (in conjunction with the Profile Manager), and the creation, storage and retrieval specific content provider's contacts information The Content Provider Manager maintains profile and contact information within the system for content provider based users. For content providers, additional users can be set up or modified by any active user belonging to the content provider (in lieu of a registration process), and all users belonging to a content provider are preferably listed on the content provider contact page with quick access to remove or modify them. Although the information for content providers varies from consumers, the functionality is very similar and may be leveraged/reused where possible.

The Content Provider Manager is preferably accessible from all content provider pages following successful login. Information typically required includes the content provider's user name, a validated email address (used for login name if alternate login not supplied), and alternate login (if email address is not used as the login name), a password, the name of the content provider's organization, company address, billing address (if different), a contact name (first and last separated for quick search), contact title, phone and fax numbers, website URL, billing information such as credit card number, card holder name and expiration date.

License Manager

A License Manager is preferably provided responsible for controlling license agreements, and provides facilities for the creation, storage and retrieval of licensing information for all content providers licensed in the content distribution system, and validation of licenses.

Showcase Manager

A Showcase Manager is preferably provided for handling showcase layout configuration and collection of personalized content provider packets for each user in the content distribution system. The Showcase Manager provides facilities for creation, storage, retrieval and deletion of showcase configuration including content provider packets collection, pages and content provider packets placement on pages, retrieving contents of any content provider packets (in conjunction with the Content Manager), and emailing of content provider packets.

The Showcase Manager handles the personalized layout configuration for a user's showcase, allowing a user to remove a content provider packet from their showcase, move a content provider packet to a different page (e.g. in a named category of content provider packets) in their showcase, add a new page/category to their showcase, rename a page/category in their showcase, reorder the pages/categories in their showcase, and remove a page/category and all content provider packets on that page from their showcase.

The Showcase Manager preferably can render a user's customized showcase (interfacing with the Content Manager), allow for display of a single content provider packet in full screen mode (interfacing with the Content Manager), allow for emailing of a single content provider packet to friends, and allow a user to add a content provider packet to their showcase when linked from search engine results or a content provider's web site link, or sent as an email, or located as a result of a content provider packet search. The Showcase Manager is preferably accessible from all user pages following user login.

Content Provider Packet Manager

A Content Provider Packet Manager is preferably provided for handling all content provider packets in the content distribution system, and provides facilities for the creation, storage and retrieval of content provider packets, management of templates for content provider packet content, and for search of content provider packets associated with a specified locale (in conjunction with the Location Manager).

The Content Provider Packet Manager controls which content provider packets are actively available and interfaces with the Location Manager to link location targeted versions of the content provider packets, and the License Manager to ensure a content provider is authorized to publish content on the content distribution system. It provides the content provider with a set of predefined templates and the ability for the content provider to upload sections of content into the template or content provider packet showcase.

The Content Provider Packet Manager also provides functionality to display a list of all content provider packets belonging to an content provider, showing name and date created with links to view, modify or delete the content provider packet; allow a content provider to add a new content provider packet; allow a content provider to modify any existing content provider packet content, including changing the template used and/or changes locales; allow a content provider to preview content prior to submission to the public (default to viewing as web browser with the ability to select various targeted devices such as PDA, cell phone etc); and allow a content provider to delete a content provider packet.

Content Manager

A Content Manager is preferably provided for managing content related to each content provider packet, and provides facilities for the creation, storage and retrieval of content provider packet content, and rendering of content provider packet contents. The Content Manager preferably converts and stores the final representation of a content provider packet, for example as XML, to facilitate interoperability and Web Services integration. The Content Manager provides functionality to render a content provider packet (interfacing with the Location Manager) to any registered user, the content provider packet being tailored to the web enabled device used by the user.

Location Manager

A Location Manager is preferably provided for managing available locales in the content distribution system, and provides facilities for the import of locales data from external data bases, the creation, storage and retrieval locales, the management of grouping of locales, and searching locations by specified demographic information such as, for example, state/province, city, or postal (zip) code.

The Location Manager manages available locales in the system, providing them to content providers when they are creating content provider packets, as well as mapping a user's home zip or other location data to an available locale and serving up the correct content provider packets if locale targeted versions exist. Additionally, a user can opt to view content provider packets for any available locale, overriding their home locale. This allows a mobile user to view content specific to their current area when traveling or working away from home.

The Location Manager also provides the ability to manage the available locales and permit grouping of locales. For example, San Diego, Calif., Orange County, Calif. and Los Angeles, Calif. may be grouped into Southern California, which in turn can be grouped into California, which in turn can be grouped into the Western United States, which in turn could be grouped into the United States. This allows a content provider to decide how specific a locale they want to target. It is evident that locales are far more general than zip codes, but to speed registration and ease the experience for a user, a user may be tracked to their home zip code, and their zip code may be mapped into one or more defined locales in the system. The Location Manager is preferably able to retrieve and sort the available locales in the system, manage the grouping of locales, and retrieve the most specifically targeted content provider packet available for a user Content Provider Directory A Content Provider Directory service is preferably provided for managing available content providers in the content distribution system, and provides facilities for the creation, storage and retrieval of content provider information, search of content providers by name, and the capture, store, grouping and sort of content providers suggested by users and others.

The Content Provider Directory provides functionality to allow a user to search existing content providers or other content in the content distribution system (i.e. content that has one or more content provider packets relating to them), providing a quick link from content provider search results to a content provider packet to enable the user to view the content provider packet and add it quickly and easily to the user's showcase. The Content Provider Directory may also capture and store any suggested content providers which the user has performed a search for or has requested but are not currently available on the content distribution system. The Content Provider Directory alerts the content distribution system sales staff via email of any such suggested additions so that they can pursue any opportunity to add the content provider.

Statistics Engine

A Statistics Engine is preferably provided to "lay over" the entire system to listen and capture activity such as content provider packets being created, their placement by users, and any activity generated through a particular content provider packet, to provide real-time information and tracking of user activity. The Statistics Engine preferably is able to capture data relating to the addition of content provider packets to showcases by users, placement of content provider packets by users including what page or category, row and column they have placed the content provider packet on the showcase page, capture any movement of placement of content provider packets, capture click-through activity of content provider packet 'content' by link, capture information relating to any purchases by the user, and capture current locale, as well as user's home zip and time of activity.

The Statistics Engine preferably interfaces with the Location Manager in order to breakdown activity by locations, as well as capture enough detail to determine specific content usage within any given content provider packet, such as link activity. All marketing statistics are preferably maintained historically, regardless of whether content provider packets have been deleted, or users and/or content providers have become inactive. The Statistics Engine may also capture data relating to how the user accessed a content provider packet or showcase, for example storing the identity of the search engine site or vendor's site through which the user gained access to the content distribution system.

The data gathered by the Statistics Engine relevant to each content provider may be accessed by that content provider in order to assess the effectiveness of their content provider packet content, to design improved content and to make decisions regarding future participation in the content distribution system. The data is also used by the content distribution system to determine fees to be paid by content providers and fees to be paid to the search engine sites and other web sites which host a system icon or link to the content distribution system. The data can also be mined by the content distribution system to determine effectiveness of various content provider packets for use as a marketing tool.

The Statistics Engine preferably provides web page report formats allowing totals by content provider, by content provider packet, by content provider packet links, by locale, and by predefined periods of (e.g. month to date, last 30 days, quarter to date, year to date, inception to date).

Security Manager

A Security Manager is preferably provided for controlling access to all secure content in the content distribution system and provides facilities for user authentication, authorization for access to appropriate content based on the user's role, and configuration of security parameters, such as session timeout. The Security Manager preferably controls access based on a user's role (a user is defined to encompass both consumers and content providers in this context). This role based security allows access to any secured resources granted to specific roles, with the ability to assign any users to one or more roles, rather than granting access to secured resources directly to a specific user. For example, user roles may be defined to include users belonging to or acting under the authority of the host organization of the content distribution system, any licensed content provider, a registered user, an unregistered site visitor, and third party participants in the system such a search engine provider, web portal host provider, or internet directory service provider. Any user credentials deemed necessary to identify a user's session and to be carried throughout the system for access or display purposes is preferably created, queried and managed through the Security Manager.

Available content and other gathered information stored by the content distribution system is preferably classified into two categories: public content and secured content. As the content distribution system centers around delivering content to the public, the published content provider packet content itself is intended for the general public and requires no security filtering for viewing. However, creating, modifying, and/or deleting a content provider packet is secured to permit such actions only by the relevant content provider, and by the content distribution system under certain circumstances.

Information provided by users during registration and/or later provided directly in their showcase, information provided by content providers during signup to the system, is generally considered private and is preferably secured from access by unauthorized people. Data collected by the Statistics Engine is generally considered proprietary and is also preferably secured from access by unauthorized people.

The Security Manager is also responsible for configuring and/or accessing security parameters such as session timeouts after periods of inactivity. In most physical implementations, the Application Server and/or Operating System control underlying sessions and timeouts, but the logical Security Manager encompasses the acknowledgement that these requirements exist and is preferably interfaced with.

Any non-visitor resource accessed preferably routes through the Security Manager to verify credentials and will route to the content distribution system home page if credentials are invalid or unavailable. This allows a reliable and repeatable route pattern for users as well as allowing the content distribution system home page to centralize a login area for users and content providers, and provide a link to register new users. The Security Manager is also responsible for specific routing following renewal of valid credentials if other than default routing is required. For example, if a user tries to access resource A, but their session has been expired due to prolonged inactivity so they are routed to re-login. After login, they are routed to resource A, instead of the default routing following a login.

Gateways

Various Gateway modules may be provided for communication with various parties interfacing to the content distribution system. For example, Gateway modules may be provided for users with facilities for interaction with users and providing functionality associated with showcase and personal content provider packets. Specialized gateways may include, for example, an HTTP Gateway for communication with users through HTTP and a WAP Gateway for communication with users through WAP. Gateway modules may also be provided for content providers with facilities for interaction with content providers. Specialized gateways may also be provided to Google and Overture, for example, providing the ability to use the Google or Overture API, and Portal Gateways responsible for communicating with various portals.

User Interfaces

Various User Interface modules may be provided for interacting with various classes of system user, for example, a Content Provider UI, a Technologist UI for interacting with Technologist User, and an Executive UI responsible for interacting with an Executive User.

Email Functionality

Email is preferably used as a communication tool between the content distribution system and its content providers and/or users. Email links are preferably readily accessible on the host site to the content distribution system's technical support for content providers or users requiring support or help, and to content distribution system sales for licensed content providers or those wanting to offer content provider packet content. In addition, automatic email notification preferably occurs when a new content provider is suggested by a user, any site error occurs, or a user has opted-in to be contacted for a particular event (such as new content providers and/or offers).

Static Content

The content distribution system also preferably provides static content such as a privacy policy, terms of use for users and content providers, general information about the content distribution system, and general help and/or site explanation.

Thus, the invention has been described by reference to certain embodiments discussed above. It will be recognized that these embodiments are susceptible to various modifications and alternative forms well known to those of skill in the art, and that additional embodiments may be readily envisaged. For example, although the content distribution system has been described as implemented on the internet, it could also be implemented on private networks.

Many modifications in addition to those described above may be made to the structures and techniques described herein without departing from the spirit and scope of the invention. Accordingly, although specific embodiments have been described, these are examples only and are not limiting upon the scope of the invention as defined by the appended claims.

What is claimed is:

1. A method for content distribution on a computer network between a plurality of content providers and a plurality of users accessing the network via user terminals, the method comprising:
    storing for a user a plurality of content provider packets for content provided by one or more of the content providers in a server computer;
    displaying a link to the user for selecting a first content provider packet;
    detecting the user's activation of the link;
    providing information to the user's terminal for display of relevant content of the first content provider packet to the user based on user's activation of the link, the first content provider packet being displayed as a customizable display area containing first information from a first content provider's web site and links for access to additional information from the first content provider's web site, wherein the first information is identified by one or more content markers integrated into the first content provider's web site; and
    storing the first content provider packet in the server computer at the request of the user for future access by the user.

2. The method according to claim 1, wherein the step of providing information to the user's terminal for display of the first content provider packet comprises providing information for display of the plurality of content provider packets stored for the user.

3. The method according to claim 2, wherein the plurality of content provider packets are for content from a plurality of content providers.

4. The method according to claim 3, wherein the plurality of content provider packets are displayed together in a showcase display.

5. The method according to claim 4, wherein the one or more content provider packets are presented to the user in display positions allocated at least in part by the user.

6. The method according to claim 5, wherein the first content provider packet for content provided by the first content provider is displayed above a second content provider packet for content provided by a second content provider where a first fee paid by the first content provider is higher than a second fee paid by the second content provider.

7. The method according to claim 5, wherein the one or more content provider packets are arranged in categories, the position of the content provider packets within each category being allocated at least in part by the user.

8. The method according to claim 7, wherein, within a first category, the first content provider packet for content provided by the first content provider is displayed above a second content provider packet for content provided by a second content provider where a first fee paid by the first content provider is higher than a second fee paid by the second content provider.

9. The method according to claim 2, wherein the plurality of content provider packets are displayed together in positions allocated at least in part by the user.

10. The method according to claim 2, wherein the content provider packet comprises a standardized but user-customizable format for displaying content created by the content providers.

11. The method according to claim 2, wherein content for the content provider packet is updated periodically by the content provider.

12. The method according to claim 11, wherein the content is updated by means of content markers integrated into a content provider's web site.

13. The method according to claim 2, wherein the content provider packet is added to the user's personal collection of content provider packets.

14. The method according to claim 13, wherein content for the content provider packet is updated periodically by the content provider.

15. The method according to claim 14, wherein the content provider packet includes a link for forwarding the content provider packet to a recipient chosen by the user.

16. The method according to claim 15, wherein the content for the content provider packet is tailored to the demographic profile of the user.

17. The method according to claim 15, further comprising receiving information from the user about the user's geographic location for adapting the content for the content provider packet to the user's geographic location.

18. The method according to claim 1, wherein the link is provided on a web site accessed by the user.

19. The method according to claim 18, further comprising:
    receiving a fee from a content provider providing content for the content provider packet; and
    paying a portion of the fee to a web site displaying the link.

20. The method according to claim 1, wherein the link is displayed adjacent to search engine results of a search conducted by the user, the search results relating to the first content provider packet.

21. The method according to claim 1, wherein each of the content provider packets comprise:
    at least one line for displaying text;
    at least one link to a web site for the content provider providing content for the content provider packet; and
    at least one link to forward data for access to the content provider packet via email.

22. The method according to claim 1, wherein the user terminals include portable network access devices and at least a portion of the content provider packets are adapted for display on portable network access devices.

23. The method according to claim 1, further comprising:
    updating a content provider packet with data provided by a content provider subsequent to the creation of the content provider packet.

24. The method according to claim 1, wherein the information is provided to the user terminal for display of the content provider packets to the user in a single display comprising one or more pages.

25. The method according to claim 1, wherein information is provided to the user terminal for presentation of the one or more content provider packets to the user arranged in categories.

26. The method according to claim 25, wherein the display position of the content provider packets within each category is allocated at least in part according to fees received from the content providers.

27. The method according to claim 1, further comprising storing demographic information relating to the user; and
wherein providing the information to the user terminal for display of the content provider packet comprises tailoring the content of the content provider packet based at least in part on the demographic information.

28. The method according to claim 1, further comprising:
measuring a number of users who request to store the first content provider packet; and
charging the first content provider a fee related to the measurement.

29. The method according to claim 1, further comprising:
measuring a number of times the first content provider packet is displayed to users; and
charging the first content provider a fee related to the measurement.

30. The method according to claim 1, further comprising:
providing a link in the first content provider packet for access to another page;
measuring a number of times users select the link; and
charging the first content provider a fee related to the measurement.

31. The method according to claim 1, further comprising:
providing a link in the first content provider packet for access to the first content provider's web site;
detecting a user's access to the first content provider's web site via the link;
measuring an amount of money spent byte user to purchase products or services from the first content provider's web site; and
charging the first content provider a fee related to the measurement.

32. The method according to claim 1, further comprising:
providing means for transmitting the first content provider packet to one or more recipients selected by the user.

33. A server computer for communication of information between content providers and users on a computer network, the server computer operatively coupled to a plurality of user terminals, the server computer comprising:
a first memory for storing a plurality of content provider packets for content provided by one or more of the content providers;
a second memory for storing a plurality of content provider packet selections from one or more users via one or more of the user terminals for future access by the one or more users;
a first program module for providing a link for access to the content provider packets selected by a first user; and
a second program module for providing information to the first user's terminal, upon the first user's activation of the link, for display of relevant content of the content provider packets selected by the first user in a customizable display area containing first information from the content providers' web sites and links for access to additional information from the content providers' web sites, wherein the first information is identified by content markers integrated into the content providers' web sites.

34. The server according to claim 33, wherein the second program module provides a link for access to a content packet showcase for displaying the content provider packets selected by the first user, in a browser toolbar or main menu on the user terminal.

35. The server according to claim 33, wherein the server stores information for displaying the one or more content provider packets in display positions allocated at least in part by the first user.

36. The server according to claim 35, wherein the server stores information for displaying the first content provider packet for content provided by a first content provider in a display position above a second content provider packet for content provided by a second content provider where a first fee paid byte first content provider is higher than a second fee paid by the second content provider.

37. The server according to claim 35, wherein the second program module displays the content provider packets selected by the first user in categories, the position of the content provider packets within each category being allocated at least in part by the first user.

38. The server according to claim 33, wherein each of the content provider packets comprise:
at least one line for display of text;
at least one link to a web site for the content provider providing content for the content provider packet; and
at least one link to forward data for access to the content provider packet via email.

39. The server according to claim 33, wherein the user terminals include portable network access devices and at least a portion of the content provider packets are adapted for display on portable network access devices.

40. The server according to claim 33, further comprising a third program module for updating a content provider packet with data provided by a content provider subsequent to the creation of the content provider packet.

41. The server according to claim 33, wherein the information is provided to the first user's terminal for display of the content provider packets to the first user in a single display comprising one or more pages, the content provider packets arranged in categories within the display.

42. The server according to claim 41, wherein the second program module displays the content provider packets within each category in positions allocated at least in part by the first user.

43. The server according to claim 33, wherein the server computer includes a user information database having at least one user record comprising demographic information provided by the first user.

44. The server according to claim 43, wherein the server adapts the content of at least one of the content provider packets based at least in part on the demographic information.

45. The server according to claim 33, further comprising a fourth program module for measuring a number of times the first content provider packet is displayed to users and charging a content provider providing content forte first content provider packet a fee related to the measurement.

46. The server according to claim 33, further comprising a fifth program module for measuring a number of times users select a link in the first content provider packet for access to another page and charging a content provider providing content for the first content provider packet a fee related to the measurement.

47. The server according to claim 33, further comprising a sixth program module for detecting a user's access to a first content provider's web site via a link in the first content provider packet for access to the first content provider's web site, measuring an amount of money spent by the user to purchase products or services from the first content provider's web site, and charging the first content provider a fee related to the measurement.

48. The server according to claim 33, further comprising a seventh program module for allocating a portion of a fee received from a content provider providing content for the content provider packet to a web site displaying the link.

49. The server according to claim 33, further comprising an eight program module for transmitting a content provider packet to one or more recipients selected by a user.

50. A method for content distribution on a computer network between a plurality of content providers and a plurality of users accessing the network via user terminals, the method comprising:
displaying a link to a user for selecting content provided by a first content provider;
detecting the user's activation of the link;
storing data in a server computer to enable future access by the user to the selected content; and
providing information to the user's terminal for display of the selected relevant content based on user's activation of the link, the selected content being displayed with content previously selected by the user from other content providers,
wherein the selected and previously selected content is displayed in a standardized but user-customizable format in a display area containing first information from the respective content providers and links for access to additional information from the content providers, the first information being identified by content markers integrated into the content providers' web sites.

51. The method according to claim 50, wherein the content is presented to the user in display positions allocated at least in part by the user.

52. The method according to claim 50, wherein the content is displayed with at least one link for forwarding, via email to a recipient chosen by the user, data for access to the selected content.

53. The method according to claim 50, further comprising updating the selected content with data provided by the first content provider subsequent to selection of the content by the user.

54. The method according to claim 53, wherein the selected content is updated by means of the content markers integrated into the first content provider's web site.

55. The method according to claim 53, wherein the selected content is displayed with at least one link for forwarding, via email to a recipient chosen by the user, data for access to the selected content.

56. The method according to claim 53, further comprising storing demographic information relating to the user; and
tailoring the selected content displayed to the user based at least in part on the demographic information.

57. The method according to claim 53, wherein the step of displaying a link to a user comprises displaying the link adjacent to search engine results of a search conducted by the user, the search results relating to the selected content.

58. The method according to claim 53, wherein the user terminals include portable network access devices and at least a portion of the selected content is adapted for display on a portable network access device.

59. The method according to claim 50, further comprising:
providing a first link with the selected content for access to the first content provider's web site;
detecting a user's access to the first content provider's web site via the first link;
detecting an action by the user relating to the first content provider's web site; and
charging a fee related to the action.

60. The method according to claim 59, further comprising sharing a portion of the fee with a third party for providing access to the user to the selected content.

61. A method for content distribution on a computer network between a plurality of content providers and a plurality of users accessing the network via user terminals, the method comprising:
displaying a link to a user for selecting a first content provider packet for displaying content provided by a first content provider's web site;
detecting the user's activation of the link;
storing data in a server computer as a result of the user's activation of the link to enable future access to the first content provider packet; and
providing data to the user's terminal for display of relevant content of the first content provider packet based on user's activation of the link, the data being identified by a content marker integrated into the first content provider's web site, the first content provider packet being displayed with a second provider packet previously selected by the user, wherein the second content provider packet is for displaying content provided by a second content provider.

62. The method according to claim 61, further comprising providing data to the user's terminal for display of updated content for the first content provider packet upon subsequent access by the user of the first content provider packet.

63. The method according to claim 62, wherein the data for display of updated content is provided by means of the content marker integrated into the first content provider's web site.

64. The method according to claim 62, wherein the content provider packets are presented to the user in display positions allocated at least in part by the user.

65. The method according to claim 62, wherein the first and second content provider packets are displayed in a display area containing information from the content providers and links for access to additional information from the content providers.

66. The method according to claim 62, wherein the first content provider packet comprises at least one link to forward data to a recipient selected by the user for access to content of the first content provider packet.

67. The method according to claim 62, further comprising storing demographic information relating to the user; and
tailoring the content of the first content provider packet based at least in part on the demographic information.

68. The method according to claim 62, wherein the step of displaying a link to the user comprises displaying the link with search results of a search conducted by the user, the search results relating to the first content provider packet.

69. The method according to claim 62, wherein the user terminals include portable network access devices and at least a portion of the first content provider packet is adapted for display on a portable network access device.

70. The method according to claim 62, further comprising:
providing a first link with the first content provider packet for access to the first content provider's web site;
detecting a user's access to the first content provider's web site via the first link;
detecting an action by the user relating to the first content provider's web site; and
charging a fee related to the action.

71. The method according to claim 70, further comprising sharing a portion of the fee with a. third party for providing access to the user to the first content provider packet.

* * * * *